Figure 1:
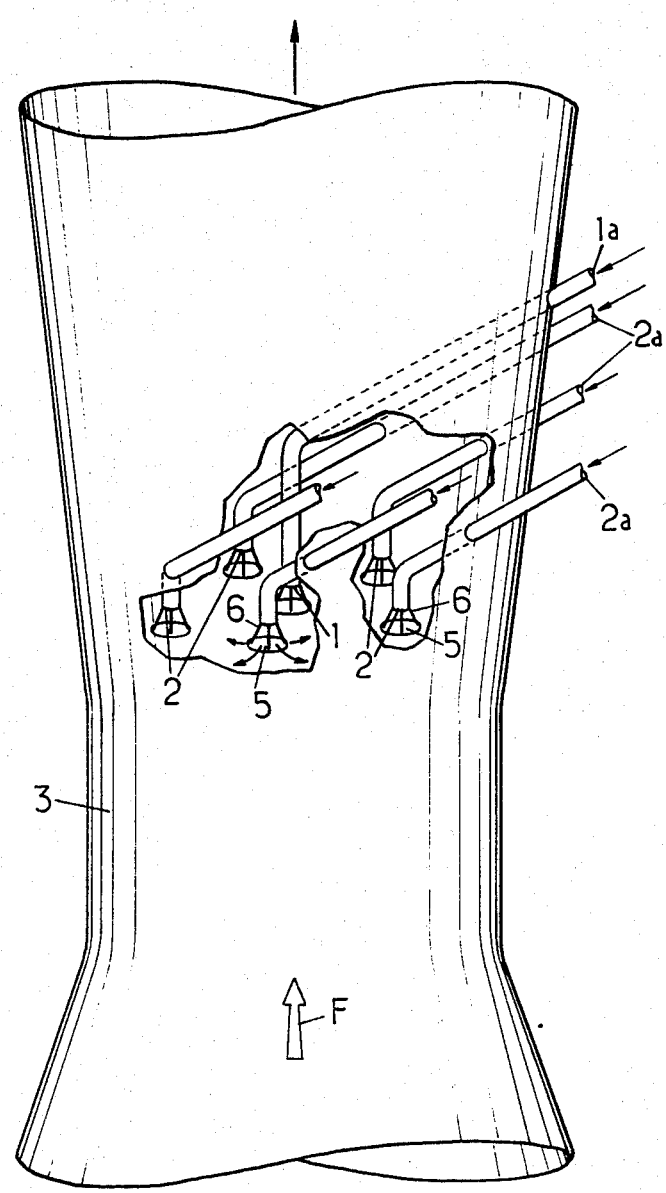
Figure 2:
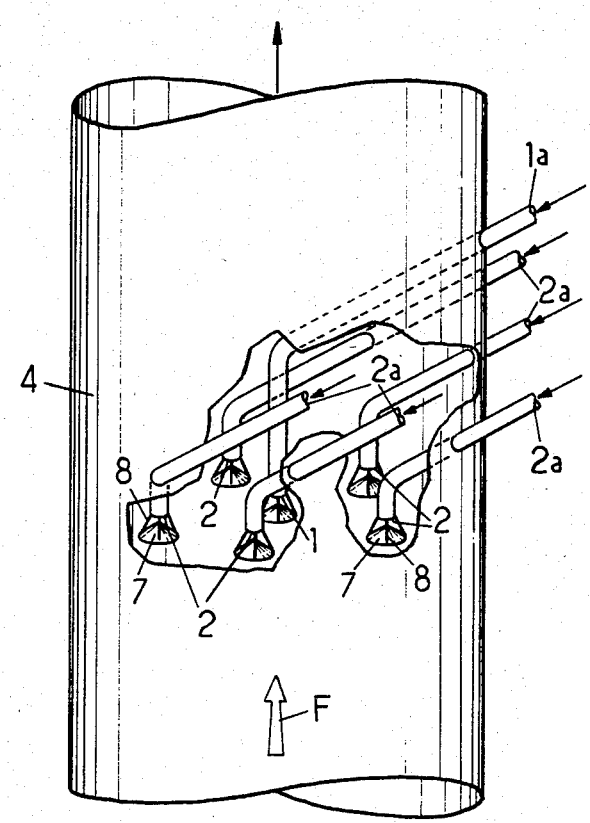
Figure 3:
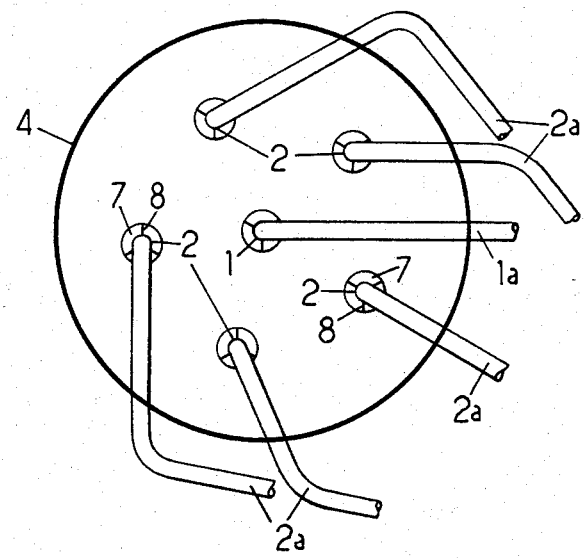

United States Patent [19]

Carré et al.

[11] Patent Number: 4,534,778
[45] Date of Patent: Aug. 13, 1985

[54] INSTALLATION FOR INJECTING A POWDERY MATERIAL, PARTICULARLY AN ADSORBENT MATERIAL, INTO A CONTACT COLUMN

[75] Inventors: Christian Carré, Houilles; Jean P. Guibet, Dormont St. Pierre de Bailleul, both of France

[73] Assignee: Air Industrie, Courbevoie, France

[21] Appl. No.: 542,058

[22] Filed: Oct. 14, 1983

[30] Foreign Application Priority Data

Oct. 25, 1982 [FR] France ............... 82 17826

[51] Int. Cl.³ .................................. B01D 53/06
[52] U.S. Cl. .................................. 55/340; 55/71; 55/390; 55/474; 422/306
[58] Field of Search ........... 55/71, 77, 79, 98, 181, 55/223, 340, 387, 390, 474; 141/236, 285, 286; 222/148, 190, 630; 406/123, 170, 181; 422/306

[56] References Cited

U.S. PATENT DOCUMENTS

| | | | |
|---|---|---|---|
| 2,875,844 | 3/1959 | Pring | 55/77 |
| 3,726,065 | 4/1973 | Hausberg et al. | 55/223 |
| 3,760,565 | 9/1973 | Fish | 55/79 X |
| 3,780,497 | 12/1973 | Muhlrad | 55/77 X |
| 3,790,143 | 2/1974 | Nix | 55/77 X |
| 3,900,298 | 8/1975 | St. Cyr et al. | 55/71 |
| 3,992,176 | 11/1976 | Bohne et al. | 55/71 |
| 4,042,667 | 8/1977 | Ishiwata et al. | 55/71 X |
| 4,065,271 | 12/1977 | Weckesser et al. | 55/71 X |
| 4,424,837 | 1/1984 | Farrell | 141/286 X |

FOREIGN PATENT DOCUMENTS

| | | | |
|---|---|---|---|
| 2803250 | 8/1978 | Fed. Rep. of Germany | 55/71 |
| 2161933 | 7/1973 | France | 55/71 |
| 162332 | 12/1980 | Japan | 55/71 |
| 1201074 | 8/1970 | United Kingdom | 406/181 |
| 2068920 | 8/1981 | United Kingdom | 55/71 |

Primary Examiner—Robert Spitzer
Attorney, Agent, or Firm—Larson and Taylor

[57] ABSTRACT

The invention provides an installation for injecting a powdery material, particularly an adsorbent material, into a contact column—as a rule vertical—through which flows a stream of gas, more especially gas laden with polluting effluents which it is desired to fix on said material, this installation comprising means opening into the column for injecting fresh material and for injecting recycled material, that is to say material already having served for the same purpose, characterized in that said means comprise a number of nozzles (2) for injecting recycled material, spaced apart about at least one nozzle (1) for injecting fresh material, these nozzles being disposed in the column (3 or 4).

9 Claims, 3 Drawing Figures

INSTALLATION FOR INJECTING A POWDERY MATERIAL, PARTICULARLY AN ADSORBENT MATERIAL, INTO A CONTACT COLUMN

The present invention relates to an installation for injecting a powdery material, more especially an adsorbent material, into a contact column—as a rule vertical—through which flows a stream of gas, more especially a gas laden with polluting effluents which it is desired to fix on said material, this installation comprising means opening into the column for injecting the fresh material and for injecting recycled material, that is to say material having already been used for the same purpose.

Said material may be for example formed by alumina particles and said gas flow be formed by smoke or fumes laden with fluorine containing compounds or other harmful products such as tar vapors and produced for example during processes for manufacturing aluminium.

Then said smoke or fumes is purified before being discharged into the atmosphere, by injecting alumina into a contact column through which this smoke or fumes flow, which allows said harmful products to be fixed, by adsorption, on the alumina.

Since alumina (or other adsorbent material) remains still partially active on leaving this column, it is usually partially recycled to the input thereof by injecting it therein at the same time as a certain (smaller) proportion of fresh adsorbent material, so as to increase the adsorption efficiency.

Such processes are known, and more especially from French Pat. No. 2 139 648 of May 28, 1971, which relates precisely to the adsorption of fluorine containing compounds on alumina.

According to the embodiments described in this patent, the alumina having already served for adsorption is recycled into the contact column through a duct opening laterally thereinto and which moreover serves at the same time for introducing fresh alumina, the mixing of the fresh alumina with the recycled alumina taking place upstream.

This arrangement is not the most favorable, for then the "active density" of the alumina is not distributed homogeneously over the whole sectional area of the contact column, which of course adversely affects the efficiency of the purification.

The aim of the present invention is to overcome this disadvantage of the prior art and to increase considerably the efficiency of the purification in installations of the above described type, even in the case of other products, and while increasing at the same time the homogeneity of the distribution and activity of the powdery material over the whole cross sectional area of the contact column.

For this, an installation of the general type defined at the beginning is, in accordance with the invention, characterized in that said means comprise a number of nozzles for injecting recycled material spaced apart around at least one nozzle for injecting fresh material, these nozzles being disposed in the column.

While providing in each recycled material injection nozzle a sufficient flowrate—which as a general rule will be considerably greater than the flowrate from the nozzle(s) for injecting fresh material—the distribution and the activity of the powdery material may be uniformized throughout the column and therefore the efficiency of the purification may be considerably increased.

This advantage provided by the invention will be particularly advantageous when large diameter contact columns are used through which passes a high flowrate of a gas to be purified.

By multiplying appropriately the number of nozzles for injecting recycled material, depending on the section of the column, it can in fact be readily understood that the activity of the powdery material will be uniformized throughout the whole of this cross section, whatever it is.

Within the scope of the general definition of the invention which was given earlier, the different nozzles may be spaced apart in different arrangements.

More particularly, in accordance with the invention, the nozzle for injecting fresh material may be provided disposed centrally or approximately centrally in said column and said nozzles for injecting recycled material are spaced evenly apart thereabout, being preferably disposed at equal or approximately equal distances both from each other and from the lateral wall of the column.

It can be seen that this spacing apart of the different nozzles will allow the powdery material to sweep practically the whole of the cross section of the contact column, while avoiding almost completely, or by minimizing, the creation of dead zones. This arrangement, in particular, provides a homogenous distribution of the powdery material in the gas flows from the first meters travelled through the column by this flow.

In the frequent case of a column with circular cross section, the nozzles for injecting recycled material will thus be all disposed at equal or approximately equal distances from the central nozzle for injecting fresh material. In the case of a convergent-divergent column, it will be further advantageous to provide, so as to improve the homogeneity of distribution of the powdery material, for the assembly of said nozzles to be disposed at the level or approximately at the level of the neck of this convergent-divergent device, or in the divergent portion.

In any case, it is known that the purpose of this convergent-divergent device or venturi is generally to prevent the powdery material injected into the column from falling under the effect of gravity, and so to cause it to be drawn up by the rising flow of the gas to be purified in the column, even when this latter is of a large diameter.

This convergent-divergent device or venturi is not on the contrary necessary when the rising speed of the gas is sufficient to carry the powdery material upwards.

According to yet another feature of the invention, said nozzles are provided opening into the column in counter-current fashion with respect to the direction of said gas flow therein.

Thus, before following its rising path, the powdery material will undergo a change of direction in the column of 180°, which further promotes the homogeneity of its distribution therein.

In addition it may be provided for each nozzle to be associated with a diffuser device adapted to spread out in a radial sheet the material which leaves therefrom.

This arrangement will result in further reducing the risk of creation of dead zones in the column, by considerably increasing the area swept by each nozzle.

Very simply, these diffuser means or jet arresters may be each formed by a plate fixed at a short distance from the orifice of the corresponding nozzle.

Under the effect of the impact, the jet of powdery material will then be dispersed in the form of a sheet which will then be transformed into a cloud of particles by the rising gas current.

The plate in question may be flat and perpendicular to the axis of the column, in which case the sheet of material is dispersed horizontally, the column being assumed substantially vertical or, as a variant, said plate may also be provided in the form of a cone with axis parallel to that of the column and with its apex directed upwards.

In this case, the sheet of treatment material follows first of all a downwardly directed path, before rising again under the entraining effect of the rising flow of treated gas, which promotes even further its dispersion therein.

Two embodiments of the invention will now be described by way of examples, which are in no wise limiting, with reference to the figures of the accompanying drawings in which:

FIG. 1 is a schematical perspective view, with parts cut away, of a convergent-divergent device of a contact column equipped in accordance with the invention;

FIG. 2 is a similar view of a cylindrical contact column; and

FIG. 3 is a cross-sectional view of a column equipped in accordance with the invention, better showing an advantageous distribution of the nozzles.

In the different figures, there is shown at 1 a nozzle for injecting fresh material (for example alumina) and at 2 different nozzles for injecting recycled material, namely in the case in question alumina having already served for adsorption of polluting effluents such as fluorine containing compounds or tars which the gases to be treated contain, all these nozzles opening downwards.

These gases may, as was mentioned above, be formed for example by smoke or fumes leaving tanks used in processes for manufacturing aluminium; these fumes or this smoke must of course be freed of said polluting effluents before discharge thereof into the atmosphere.

In the case of FIG. 1, the different nozzles have been shown disposed in a convergent-divergent device 3, with vertical axis and through which said smoke or fumes flow in the rising direction, as shown by arrow F, the upper end of this convergent-divergent device 3 being connected to a contact column properly speaking, whose height will depend on the desired contact time between the alumina injected by nozzles 1 and 2 and said smoke or fumes; taking into account of course the rising speed thereof.

In the case of FIG. 2, the different nozzles 1 and 2 have been shown disposed inside a cylindrical contact column itself, which has been referenced at 4 and through which there also flows in the rising direction (arrow F) the smoke or fumes to be treated.

As can be seen in the different figures, the nozzle 1 for injecting fresh material is disposed at the center of the convergent-divergent device or at the center of the column, and the nozzles 2 for injecting recycled material are spaced apart about nozzle 1, so that they are all equidistant from each other and all at an equal distance from the lateral wall of the convergent-divergent device or column. If the cross section of the duct is circular at the level of said nozzles, nozzles 2 will consequently all be at an equal distance from the central nozzle 1 for injecting fresh material, in the case where this nozzle is the only one.

In FIGS. 1 and 2, there is associated with each nozzle a material feed duct, referenced 1*a* for nozzle 1 and 2*a* for the different nozzles 2, all these ducts opening to the outside by passing through the lateral wall of the convergent-divergent device or column.

This feed arrangement could be replaced by a different arrangement, in the case where the obstruction of the duct by these different material feeds might be a hindrance.

To this end, a circular horizontal manifold could for example be provided connecting together all the nozzles 2 and communicating with the outside through a single duct opening laterally from the convergent-divergent device or contact column, the number of ducts then passing through said lateral wall then being reduced to two.

In FIG. 1, diffuser devices have been shown in the form of flat and horizontal plates 5, one being fixed under the nozzle 1 for injecting fresh material and the other under each of the nozzles 2 for injecting recycled material. These diffuser devices are connected mechanically to the different nozzles by rods 6. Thus, the material discharged by nozzles 1 and 2 is projected onto these plates 5 and is dispersed in the form of radial sheets which thus undergo a considerable change of direction before the powdery material which forms them is finally carried upwards by the current of rising gas to be treated which flows through the convergent-divergent device 3. Thus, an excellent dispersion of the material discharged from nozzles 1 and 2 is obtained.

This dispersion may be further increased by replacing the flat and horizontal plates 5 of FIG. 1 by cones 7 such as those which equip the nozzles 1 and 2 of the embodiment of FIG. 2. Similarly, these cones are connected to the corresponding nozzles by fixing rods 8. In this case, the material will follow a downward path over a certain height from nozzles 1 and 2 before being finally carried upwards by the rising gas stream flowing through column 4.

It can be seen in FIG. 3 how the different radial sheets produced by each of nozzles 1 and 2, overlap to fill substantially the whole of the cross section of the column, thus avoiding practically any creation of dead zones therein.

Since the fresh alumina discharged from the central nozzle 1 has 100% adsorption capacity, whereas the recycled alumina discharged from nozzles 2 is already practically saturated by the polluting effluents, it will be readily understood that, to achieve good homogeneity of the activity of the material over the whole cross section of the convergent-diversion device or of the contact column, the material flowrates should be adjusted as a function of its activity.

Thus, the flowrate of fresh material discharged from the central nozzle 1 will be considerably smaller than the flowrate of recycled material discharged from nozzles 2.

If, for example, the alumina supplying the recycling nozzles 2 is saturated to 90%, its flowrate will be about ten times higher in each of nozzles 2 than the flowrate of fresh alumina discharged from nozzle 1.

If we consider an installation of the prior art such as described briefly at the beginning, namely an installation in which the recycled material is injected into the contact column through a single nozzle, it can be seen that with an installation in accordance with the present invention and, because of the multiplication and judicious distribution of the recycled material injection nozzles about a fresh material injection nozzle, fluorine gas can be eliminated in a proportion of 80%, which would have escaped from the installation of the prior art (which already allowed a very large part of this fluorine to be eliminated).

Since this technique is well known, the way in which the alumina, which has fixed by adsorption the polluting effluents, is separated from the fumes and smoke and recycled is not shown in the drawings: this separation may be achieved by any appropriate apparatus, for example by filters.

As is evident, and as it follows moreover from what has gone before, the invention is in no wise limited to those of its modes of application and embodiments which have been more particularly envisaged; it embraces, on the contrary, all variations thereof.

We claim:

1. An installation for injecting an adsorbent powdery material into a generally vertical contact column having a lateral wall, through which column flows a stream of gas laden with polluting effluents which it is desired to fix on said material, said installation comprising means opening into the column for injecting fresh material and for injecting recycled material already having served the same purpose, said injecting means comprising a plurality of nozzles for injecting recycled material spaced apart about at least one nozzle for injecting fresh material, said plurality of nozzles and said at least one nozzle being disposed in said column.

2. The installation according to claim 1, wherein said at least one nozzle for injecting fresh material is disposed approximately centrally in said column and said plurality of nozzles for injecting recycled material are spaced evenly apart thereabout, being disposed at approximately equal distances both from each other and from said lateral wall of the column.

3. The installation according to claim 2, wherein said column has a circular cross section, at least at the level at which said plurality of nozzles and said at least one nozzle are disposed, the plurality of nozzles for injecting recycled material all being disposed at approximately equal distances from said at least one nozzle for injecting fresh material.

4. The installation according to claim 1, in which said column comprises adjacent its base a convergent portion and a divergent portion connected by a neck, said nozzles being disposed in said divergent portion, near the level of said neck.

5. The installation according to claim 1, wherein said plurality of nozzles and said at least one nozzle open into said column counter-currently with respect to the direction of gas flow therein.

6. The installation according to claim 1, wherein each nozzle is associated with a diffuser device adapted to spread out into a radial sheet the material which is discharged therefrom.

7. The installation according to claim 6, wherein said diffuser device comprises a plate fixed at a short distance from the orifice of the corresponding nozzle.

8. The installation according to claim 7, wherein said plate is flat and perpendicular to the axis of the column.

9. The installation according to claim 7, wherein said plate comprises a cone having an axis parallel to that of the column and with its apex directed upwardly.

* * * * *